US010868433B2

(12) United States Patent
Han

(10) Patent No.: US 10,868,433 B2
(45) Date of Patent: Dec. 15, 2020

(54) SMARTPHONE WIRELESS CHARGING STORAGE DEVICE OF CONSOLE FOR VEHICLE

(71) Applicant: SEOYON E-HWA CO., LTD., Seoul (KR)

(72) Inventor: Hyun Pil Han, Gyeonggi-do (KR)

(73) Assignee: SEOYON E-HWA CO., LTD.

( * ) Notice: Subject to any disclaimer, the term of this patent is extended or adjusted under 35 U.S.C. 154(b) by 281 days.

(21) Appl. No.: 16/038,264

(22) Filed: Jul. 18, 2018

(65) Prior Publication Data
US 2019/0089186 A1 Mar. 21, 2019

(30) Foreign Application Priority Data
Sep. 21, 2017 (KR) .................. 10-2017-0121992

(51) Int. Cl.
*H01M 10/46* (2006.01)
*H02J 7/02* (2016.01)
*H02J 7/00* (2006.01)
*H02J 50/10* (2016.01)
*H02J 50/90* (2016.01)
*B60R 11/02* (2006.01)
*B60R 11/00* (2006.01)

(52) U.S. Cl.
CPC .......... *H02J 7/025* (2013.01); *B60R 11/0241* (2013.01); *H02J 7/0027* (2013.01); *H02J 7/0045* (2013.01); *H02J 50/10* (2016.02); *H02J 50/90* (2016.02); *B60R 2011/0007* (2013.01); *B60R 2011/0094* (2013.01)

(58) Field of Classification Search
CPC .......... H02J 7/355; H02J 7/0042; H02J 5/005; H02J 50/10; H02J 7/0047; H02J 7/0021; B60L 53/12; H01F 38/14; B60R 7/04; B60R 2011/0094; B60R 2011/0007; B60R 2011/0075; H04M 1/04
USPC ................ 320/107, 108, 114, 115, 132, 149, 320/DIG. 18, DIG. 19
See application file for complete search history.

(56) References Cited

U.S. PATENT DOCUMENTS

| | | | |
|---|---|---|---|
| 8,816,636 B2 * | 8/2014 | Shinde | B60R 7/04 320/108 |
| 2014/0167438 A1* | 6/2014 | Lambert | B60R 16/02 296/24.34 |
| 2014/0265555 A1* | 9/2014 | Hall | B60L 53/30 307/9.1 |
| 2015/0326062 A1* | 11/2015 | Gonzalez Valdez | H02J 7/042 320/108 |

(Continued)

FOREIGN PATENT DOCUMENTS

| | | |
|---|---|---|
| KR | 101437948 B1 | 9/2014 |
| KR | 101517694 B1 | 5/2015 |

(Continued)

*Primary Examiner* — Edward Tso
(74) *Attorney, Agent, or Firm* — Tarolli, Sundheim, Covell & Tummino LLP

(57) ABSTRACT

Provided herein is a smartphone wireless charging storage device of a console for a vehicle. A proximity sensor portion (60) and a variable fixing device (50) are provided at a storage case (10). The variable fixing device (50) is operated using the proximity sensor portion (60) according to a size of a smartphone, so that all smartphones of various sizes can be stably fixed, and thus charging efficiency can be improved.

13 Claims, 8 Drawing Sheets

(56) References Cited

U.S. PATENT DOCUMENTS

| | | | | |
|---|---|---|---|---|
| 2016/0365745 | A1* | 12/2016 | Hyun | H02J 7/025 |
| 2017/0324853 | A1* | 11/2017 | Ranganathan | H04M 1/04 |
| 2018/0281689 | A1* | 10/2018 | Cha | G06F 1/263 |
| 2019/0100155 | A1* | 4/2019 | Muiter | B60R 11/0241 |
| 2019/0210500 | A1* | 7/2019 | Brown | B60N 2/206 |

FOREIGN PATENT DOCUMENTS

| | | |
|---|---|---|
| KR | 20160042743 A | 4/2016 |
| KR | 20160146478 A | 12/2016 |
| KR | 200483222 Y1 | 4/2017 |

* cited by examiner

[FIG. 1]
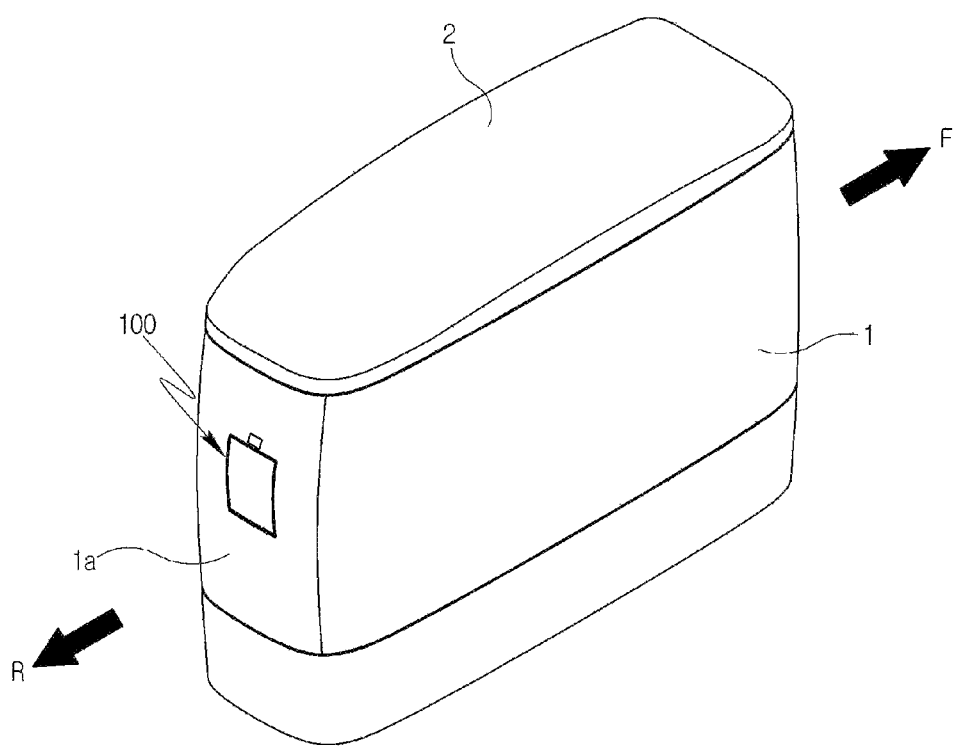

[FIG. 2]
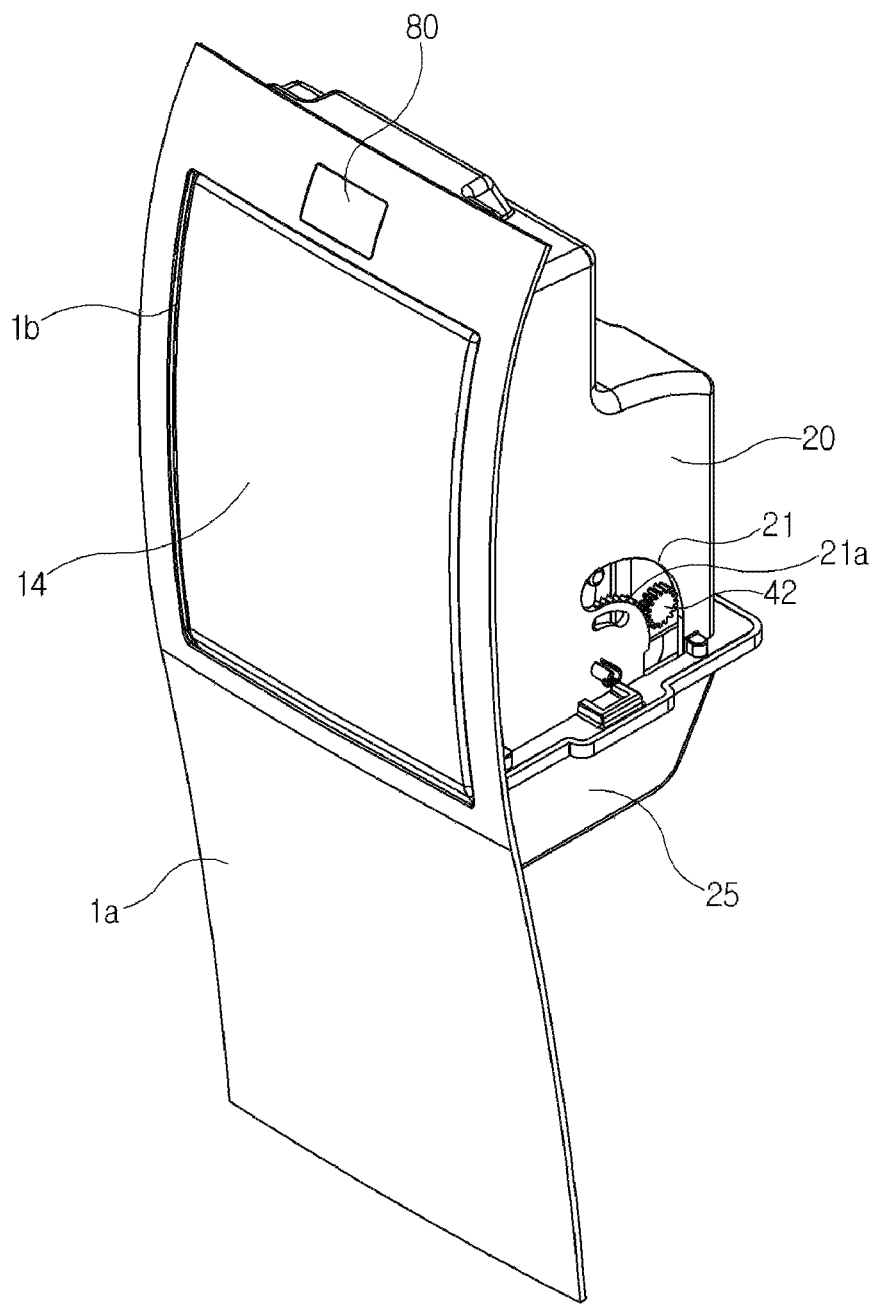

[FIG. 3]
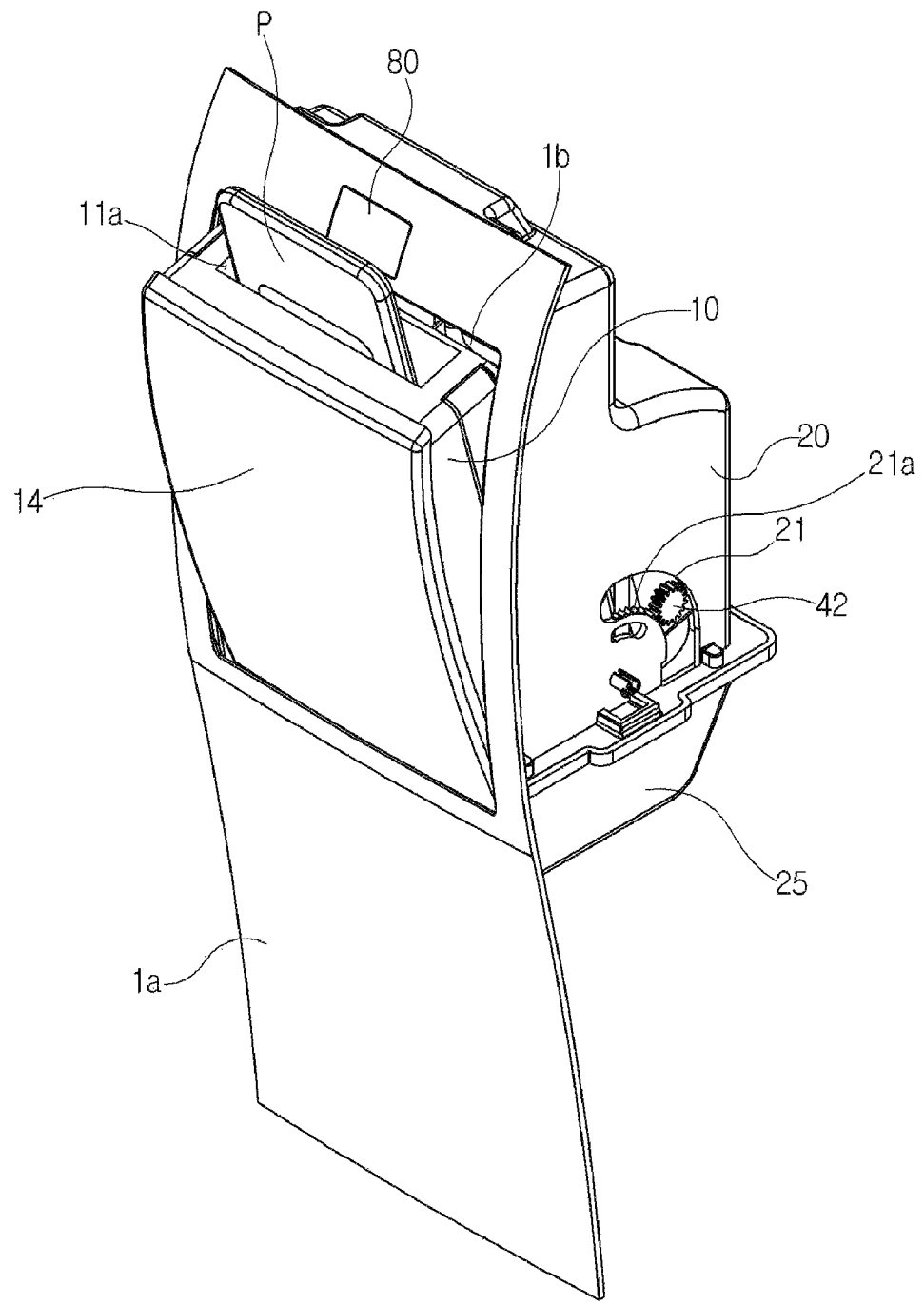

[FIG. 4]
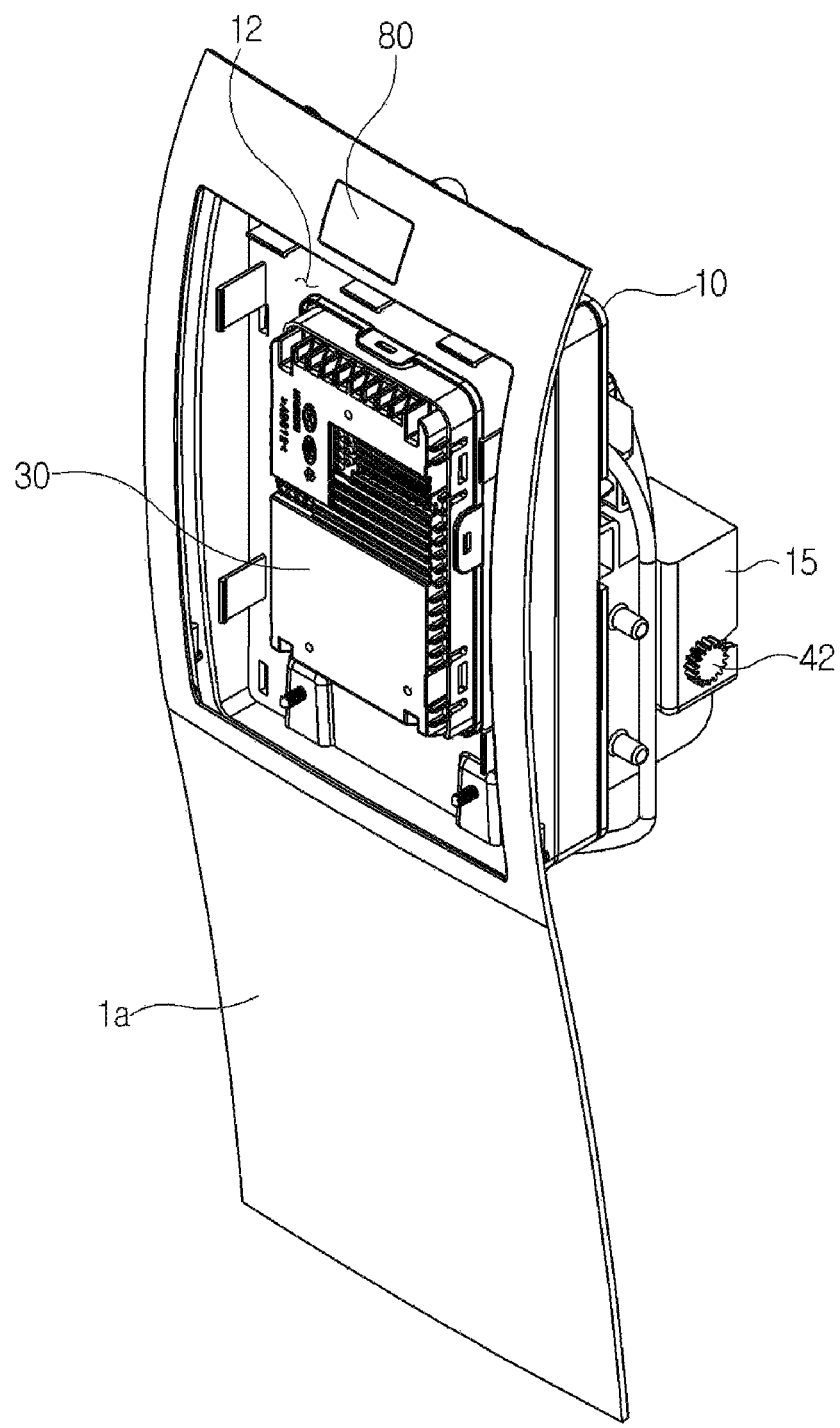

[FIG. 5]
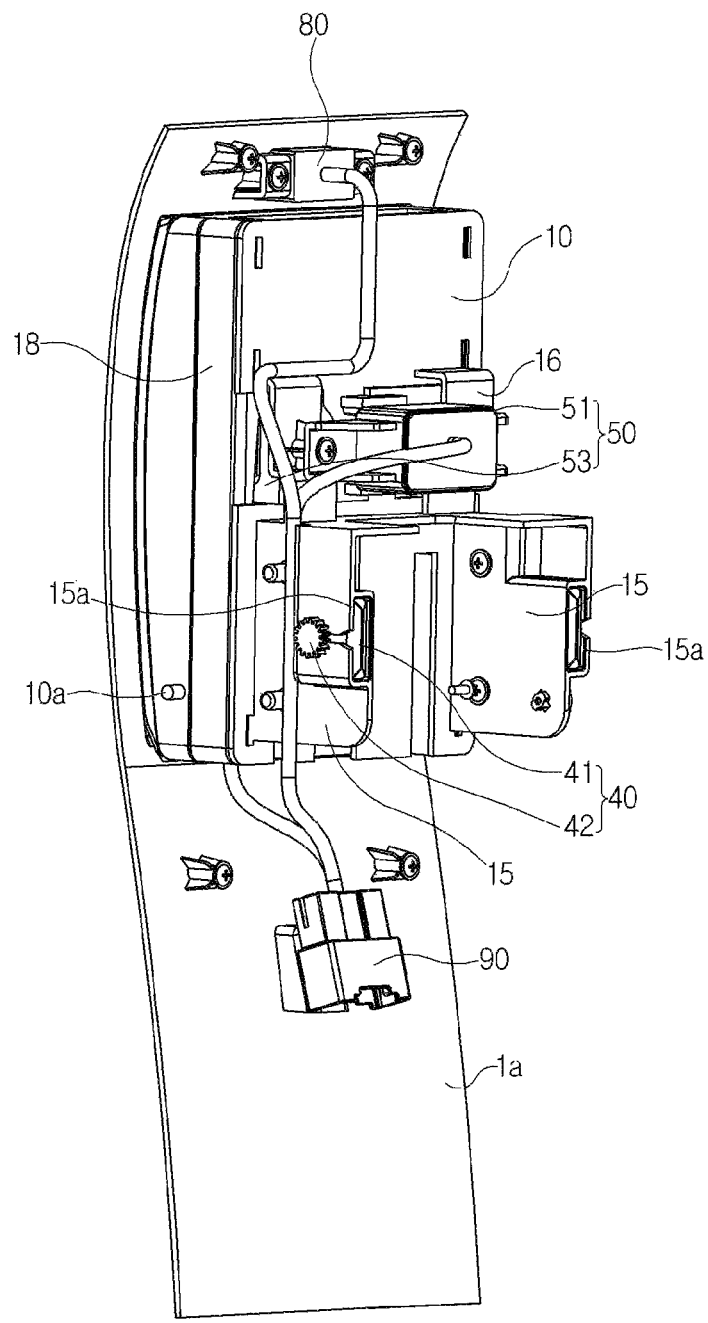

[FIG. 6]
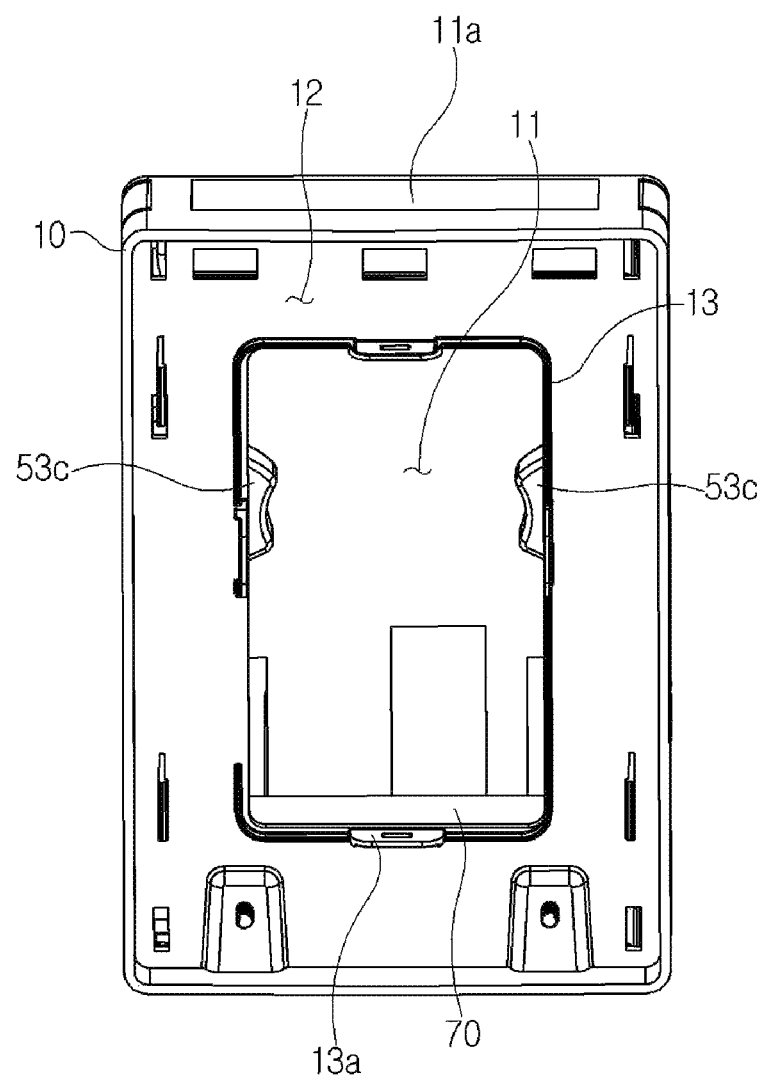

[FIG. 7]
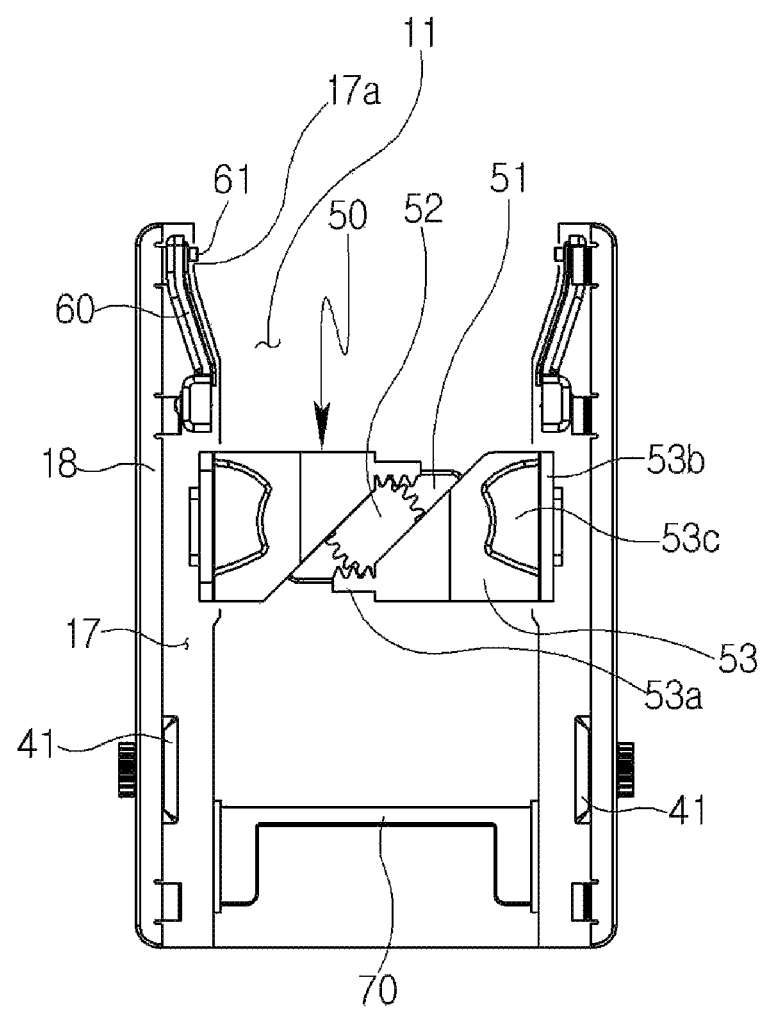

[FIG. 8]
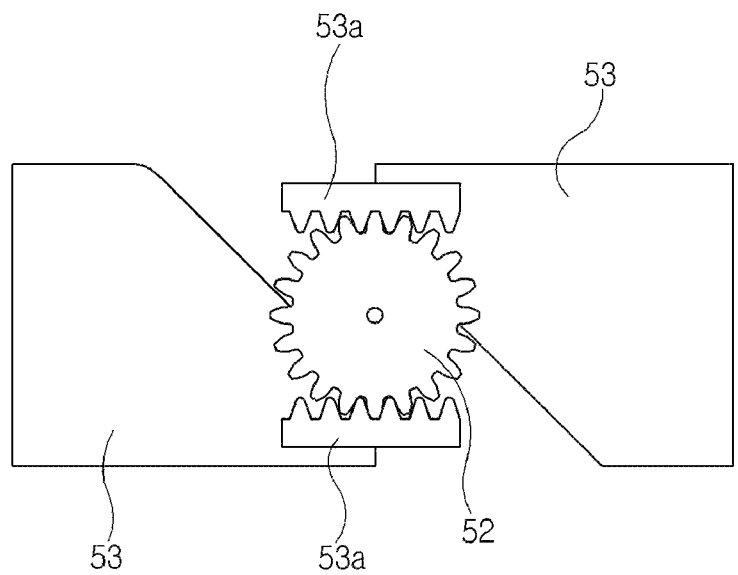

SMARTPHONE WIRELESS CHARGING STORAGE DEVICE OF CONSOLE FOR VEHICLE

CROSS-REFERENCE TO RELATED APPLICATIONS

This application claims priority to Korean Patent Application No. 10-2017-0121992, filed on Sep. 21, 2017, the disclosure of which is incorporated herein by reference in its entirety.

BACKGROUND OF THE INVENTION

Field of the Invention

Exemplary embodiments of the present invention relate to a smartphone wireless charging storage device of a console for a vehicle, which is capable of safely storing and wirelessly charging a smartphone in a vehicle interior.

Description of the Related Art

When a smartphone is charged while a vehicle is traveling, a cigar jack is mainly used as a power source to perform charging by connecting the smartphone to the cigar jack with a cable. Recently, a wireless charger is widely being used, and thus wireless charging methods are increasingly being used to charge a smartphone in a vehicle interior.

Generally, a smartphone wireless charging device of a vehicle has a structure in which a wireless charging tray having a wireless charger embedded therein is provided at a lower portion of a center fascia, and wireless charging is performed when a smartphone is placed on the wireless charging tray.

A rectangular mounting recess, into which the smartphone is inserted in a thickness direction, is formed at the wireless charging tray to maintain the smartphone at a predetermined position during driving, and a pad is attached to a surface of the wireless charging tray so as to absorb impact and prevent noise.

However, the rectangular mounting recess formed with a predetermined area and a predetermined depth is not suitable for mounting various types of smartphones having various sizes and thicknesses.

Therefore, most smartphones having sizes different from a size of a mounting recess may move away on an upper surface of a charging tray due to traveling inertia and vibration instead of maintaining predetermined positions, or when vertical vibration is large, the smartphones may be separated from the upper surface of a charging tray, so that there are problems in that charging efficiency is degraded as well as durability of the smartphone is adversely affected.

PRIOR ART DOCUMENT

Patent Document (Patent Document 1) Korean Registered Patent No. 10-1517694 (Apr. 28, 2015)

SUMMARY OF THE INVENTION

An object of the present invention is to provide a smartphone wireless charging storage device of a console for a vehicle, which is capable of improving charging efficiency and protecting a smartphone from traveling vibration by fixing the smartphone regardless of a size thereof to stably maintain a charging position of the smartphone.

Other objects and advantages of the present invention can be understood by the following description and become apparent with reference to the embodiments of the present invention. Also, it is obvious to those skilled in the art to which the present invention pertains that the objects and advantages of the present invention can be realized by the means as claimed and combinations thereof.

Provided herein is a smartphone wireless charging storage device of a console for a vehicle, the device including a storage case configured to be installed inside the console and to be pivotally opened or closed through an opening formed at the console, and having a storage space in which a smartphone is inserted and stored, an upper housing and a lower housing, each of which is configured to be installed at an inner surface of the console and enclose the storage case, a wireless charging device configured to be installed inside the storage case, an opening and closing device configured to be installed between the storage case and the upper housing and open or close the storage case, a variable fixing device configured to be installed at the storage case and to be varied according to a size of the smartphone stored in the storage case, thereby supporting and fixing a side surface of the smartphone, and an electronic control unit configured to control operations of the wireless charging device, the opening and closing device, and the variable fixing device.

A wireless charging device installation space may be formed inside the storage case, the wireless charging device may be installed in the wireless charging device installation space, the wireless charging device installation space may be communicated with the storage space through a communication hole, and a charging surface of the wireless charging device may be exposed through the communication hole to form one side surface of the storage space.

A first mounting part may be formed to protrude from both sides of a rear surface of the storage case, a motor installation part may be formed at the first mounting part, the opening and closing device may include a motor for opening and closing installed at the motor installation part and a pinion gear installed at an output shaft of the motor for opening and closing, an arc-shaped pinion gear movement hole concentric with a pivot axis of the storage case may be formed at the upper housing, and a rack gear may be formed at one side surface of the pinion gear movement hole and may be engaged with the pinion gear of the motor for opening and closing.

A box-shaped second mounting part having both open sides may be formed at the rear surface of the storage case, and the variable fixing device may include a motor for fixing installed at a rear surface of the second mounting part, a pinion gear installed at an output shaft of the motor for fixing, and a pair of moving members configured to be inserted into and installed at the second mounting part and each of which has a rack gear engaged with the pinion gear of the motor for fixing and a fixing part for supporting one side surface of the smartphone stored in the storage space.

A flange may be formed at an outer end portion of each of the pair of the moving members in a rear direction perpendicular to each of the pair of the moving members, and the fixing part may be formed to protrude inward the storage space at the flange.

End portions facing each other of the pair of the moving members may be formed in inclined surfaces parallel to each other, and horizontal rack gears may be respectively formed at end portions of the inclined surfaces and may be respectively engaged with an upper portion and a lower portion of the pinion gear of the motor for fixing.

An installation recess may be installed at both side surfaces of the storage case, a proximity sensor portion may be installed at an upper portion of the installation recess, and a sensing hole may be formed on an inner wall surface of the installation recess corresponding to a sensor of the proximity sensor portion so as to allow the sensor of the proximity sensor portion to measure a distance to the side surface of the smartphone inserted into the storage space.

The sensor of the proximity sensor portion may measure the distance to the smartphone and transmits the measured distance to the electronic control unit, and the electronic control unit may calculate a movement amount of the fixing part by halving the sum of the measured values of the sensors and may operate the motor for fixing to move the fixing part according to the movement amount.

The sensor of the proximity sensor portion and an end portion of the fixing part may be positioned on the same vertical line.

The electronic control unit may calculate the movement amount of the fixing part by subtracting a horizontal distance between the sensor and the end portion of the fixing part from a value obtained by halving the sum of the measured values of the sensors.

When the storage case is closed and a measurement signal of the proximity sensor portion is inputted, the electronic control unit may operate the motor for fixing to move the pair of the moving members in a direction of approaching each other, and when the storage case is opened, the electronic control unit may operate the motor for fixing in an opposite direction to return the pair of the moving members to standby positions.

An opening and closing button may be provided on an outer surface of the console to transmit a manipulation signal for opening or closing the storage case to the electronic control unit.

The opening and closing button may have a light emitting diode (LED) element therein and may emit lights with different colors when charging of the smartphone is underway by the wireless charging device and when charging of the smartphone is completed.

A support may be provided below the storage space of the storage case to support a lower surface of the smartphone.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view of a console in which a smartphone wireless charging storage device according to the present invention is installed;

FIGS. 2 to 5 are diagrams illustrating an installation state of the smartphone wireless charging storage device according to the present invention, only a rear side surface of a body of a console, and the smartphone wireless charging storage device;

FIG. 2 is a diagram illustrating a state in which a storage case is closed;

FIG. 3 is a diagram illustrating a state in which the storage case is opened;

FIG. 4 is a diagram illustrating a state in which an upper housing, a lower housing, and a cover of the storage case are removed from the smartphone wireless charging storage device shown in FIG. 2;

FIG. 5 is a perspective view of a rear surface shown in FIG. 4;

FIG. 6 is a front view of the storage case;

FIG. 7 is a diagram illustrating a state in which parts are installed inside the storage case; and FIG. 8 is a diagram illustrating a rear surface of a variable fixing device which is one configuration of the present invention.

DESCRIPTION OF SPECIFIC EMBODIMENTS

The present invention may be modified into various forms and may have a variety of embodiments, and, therefore, specific embodiments will be illustrated in the drawings and described in detail. The embodiments, however, are not to be taken in a sense which limits the present invention to the specific embodiments, and should be construed to include modifications, equivalents, or substitutes within the spirit and technical scope of the present invention. For clarity and convenience of description, thickness of lines and sizes of components shown in the accompanying drawings may be exaggerated.

Further, all terms used hereinafter are defined by considering functions in the present invention, and meanings thereof may be different according to a user, the intent of an operator, or custom. Therefore, definitions of these terms should follow contexts disclosed herein.

Hereinafter, preferred embodiments of the present invention will be described in detail with reference to the accompanying drawings.

FIG. 1 is a perspective view of a console in which a smartphone wireless charging storage device according to the present invention is installed, and a wireless charging storage device 100 capable of storing and wirelessly charging a smartphone is installed at a rear panel 1a of a console 1 which is installed at an inner floor of a vehicle (an arrow F indicates a front direction of the vehicle, and an arrow R indicates a rear direction of the vehicle).

An armrest 2 provided on top of the console 1 is slidable in a front-rear direction and is configured to open or close a storage space inside the console 1.

As shown in FIGS. 2 to 5, the wireless charging storage device 100 may be installed inside the rear panel 1a of the console 1 and may be opened or closed to the outside or inside of the console 1 through an opening 1b which is formed at the rear panel 1a of the console 1.

The wireless charging storage device 100 includes a storage case 10 having a lower end installed at an inner portion of the console 1 to be pivotable about a pivot shaft 10a (see FIG. 5) and configured to be opened or closed through the opening 1b, an upper housing 20 and a lower housing 25 which are installed inside the rear panel 1a of the console 1 to enclose the storage case 10, a wireless charging device 30 installed inside the storage case 10, an opening and closing device 40 installed between the storage case 10 and the upper housing 20 and configured to open or close the storage case 10, and a variable fixing device 50 installed at the storage case 10 and configured to fix a smartphone P stored in the storage case 10 regardless of a size of the smartphone P.

The pivot shaft 10a is formed at a corner of one side of a lower end of the storage case 10, and a shaft support (not shown) at which an end portion of the pivot shaft 10a is inserted into and supported by is formed at a portion of the upper housing 20 corresponding to the pivot shaft 10a.

A storage space 11 capable of accommodating the smartphone P is formed inside the storage case 10, and an entrance of the storage space 11, i.e., an insertion hole 11a, is formed at an upper end surface of the storage case 10. Therefore, the smartphone P may be inserted through the insertion hole 11a and stored in the storage space 11 inside the storage case 10 (see FIGS. 3 and 6).

A wireless charging device installation space 12 is formed at a front surface portion of the storage case 10 (at a rear surface of the console 1), and the wireless charging device 30 is installed in the wireless charging device installation space 12. The wireless charging device installation space 12 and the storage space 11 are mutually communicated with each other, so that a charging surface of the wireless charging device 30 is exposed to the inside of the storage space 11 through a communication hole 13. That is, the charging surface of the wireless charging device 30 forms one side surface of the storage space 11, so that the smartphone P stored in the storage space 11 may be brought into contact with the charging surface of the wireless charging device 30.

A plurality of brackets 13a are formed at a rim of the communication hole 13, and the wireless charging device 30 is installed at the plurality of brackets 13a through engagement parts such as bolts or the like (see FIG. 6).

A cover 14 is installed at an outermost front side of the storage case 10, that is, an outer side of the wireless charging device installation space 12, thereby blocking the wireless charging device installation space 12 from the outside. The cover 14 forms a surface on the same plane as the rear panel 1a of the console 1, thereby providing an aesthetically pleasing exterior appearance of the console 1.

Substantially rectangular first mounting parts 15 are formed to protrude rearward in parallel with each other from both sides of a lower portion of a rear surface of the storage case 10.

The opening and closing device 40 is installed at each of the first mounting parts 15. A motor installation part 15a having a shape at which a motor 41 for opening and closing is insertable or installable is formed at each of the first mounting parts 15, and the motor 41 for opening and closing is installed at the motor installation part 15a.

An output shaft of each of the motors 41 for opening and closing is installed to protrude outward from each of the first mounting parts 15 (both side directions when the cover 14 is viewed from a front side), and a pinion gear 42 is installed at an end portion of the output shaft.

As shown in FIGS. 2 and 3, an arc-shaped pinion gear movement hole 21 is formed at a position on each of both side surfaces of the upper housing 20, which corresponds to the pinion gear 42, and a rack gear 21a is formed on one side surface of the pinion gear movement hole 21 and is engaged with the pinion gear 42.

The pinion gear movement hole 21 is formed in an arc shape concentric with the pivot shaft 10a of the storage case 10 (see FIG. 5), thereby forming a movement path through which the pinion gear 42 is moved without being interfered with the upper housing 20 when the storage case 10 is pivoted about the pivot shaft 10a.

Therefore, the rack gear 21a is formed on one side surface of the pinion gear movement hole 21 and the pinion gear 42 is engaged with the rack gear 21a, so that when the motor 41 for opening and closing is operated, the pinion gear 42 is moved along the rack gear 21a, and thus the storage case 10 is opened or closed by being pivoted outward or inward the rear panel 1a of the console 1.

As shown in FIGS. 5 to 8, the variable fixing device 50 is installed at an intermediate portion of the rear surface of the storage case 10, i.e., above the first mounting part 15.

The variable fixing device 50 includes a motor 51 for fixing, a pinion gear 52 provided at an output shaft of the motor 51 for fixing, and a moving member 53 configured to support and fix both side portions of the smartphone P while being laterally moved by the pinion gear 52.

A second mounting part 16 is formed at an intermediate portion of the rear surface of the storage case 10 to protrude rearward from the rear surface thereof by a predetermined distance. The motor 51 for fixing is installed outside the second mounting part 16, the output shaft of the motor 51 for fixing protrudes inward the second mounting part 16, and the pinion gear 52 is installed at an end portion of the output shaft.

The second mounting part 16 has a box shape capable of accommodating the moving member 53, an opening is provided at each of both side portions of the second mounting part 16, and the moving member 53 is inserted into the opening and thus a left-right movement of the moving member 53 is guided inside the second mounting part 16. That is, the second mounting part 16 provides an installation site for the motor 51 for fixing and the moving member 53 as well as serves as a guide for the moving member 53.

The moving member 53 is provided at each of both sides of the pinion gear 52, inner ends of the moving members 53 facing each other are formed to have inclined surfaces in parallel with each other, horizontal rack gears 53a are respectively formed at an upper end portion of the inclined surface of one of the moving members 53 and at a lower end portion of the inclined surface of the other thereof, and the rack gears 53a are respectively engaged with an upper portion and a lower portion of the pinion gear 52.

A flange 53b is formed to protrude from an outer end of each of the moving members 53 in the rear direction of the console 1 (in a direction of the cover 14) perpendicular to a base surface of the moving member 53, and a fixing part 53c is formed to protrude from an inner surface of the flange 53b in an inner direction of the storage case 10.

In an assembled state, the fixing part 53c may protrude inward the storage space 11 in which the smartphone P is stored (see FIG. 6).

Accordingly, when the motor 51 for fixing is operated, the pinion gear 52 is rotated, the moving members 53 engaged with the pinion gear 52 through the rack gears 53a are moved in the left-right direction, and thus the fixing parts 53c provided at the moving members 53 are moved in the left-right direction.

At this point, since the rack gears 53a of the moving members 53 are respectively engaged with the upper portion and the lower portion of the pinion gear 52, the moving members 53 are moved in opposite directions. That is, the moving members 53 are moved in a direction of approaching each other or departing from each other according to a rotation direction of the pinion gear 52. Thus, an operation for shortening or extending a distance between the fixing parts 53c is performed, so that the smartphone P may be fitted and fixed between the two fixing parts 53c.

Meanwhile, as shown in FIG. 7, a proximity sensor portion 60 is installed at both upper sides of the storage case 10. The proximity sensor portion 60 is located inside an installation recess 17 which is vertically formed to be concave at each of both side surfaces of the storage case 10.

A cover bracket 18 is provided at the installation recess 17, and the proximity sensor portion 60 may be fixed to an inner surface of the cover bracket 18.

A sensor 61 capable of measuring a distance to a sensing target object is provided at one side of an upper portion of the proximity sensor portion 60, and the sensor 61 is installed to face the storage space 11. A sensing hole 17*a* is formed at an inner wall of the installation recess 17 facing the sensor 61, and the sensor 61 measures a distance to a side surface of the smartphone P, which is inserted into the insertion hole 11*a*, through the sensing hole 17*a*.

A support 70 is installed at an inner lower portion of the storage space 11 to support a lower portion of the smartphone P stored in the storage space 11. The support 70 has a flat upper surface to be capable of stably supporting the smartphone P in an upright state, and both side surfaces of the support 70 are fixed to both side walls of the storage space 11. Alternatively, the support 70 may be integrally formed with the storage case 10.

Meanwhile, as shown in FIGS. 2 to 5, an opening and closing button 80 is provided at an upper portion of the rear panel 1*a* (an upper central portion of the opening 1*b* where the storage case 10 is opened or closed). A user may open or close the storage case 10 by pressing the opening and closing button 80.

The opening and closing button 80 is made of a translucent material and has a light emitting diode (LED) thereinside to emit lights with different colors when the smartphone P is being charged and when charging is completed. For example, the LED may emit red light when charging is underway and may emit green light when charging is completed.

As shown in FIG. 5, a connector 90 is provided at an inner surface of the rear panel 1*a* to supply power supply and transmit a control signal. The connector 90 is connected to electric wires for supplying required power and transmitting a control signal to all electric devices of the smartphone wireless charging storage device, such as the wireless charging device 30, the motor 41 for opening and closing, the motor 51 for fixing, the proximity sensor portion 60, and the opening and closing button 80 (only some electric wires are shown in FIG. 5, but electric wires connected to the wireless charging device 30, the motor 41 for opening and closing, and the like are not shown).

In an assembled state, the connector 90 is located inside the lower housing 25 and is connected to "other connector" inserted through an opening formed at the lower portion of the lower housing 25. The "other connector" is connected to a power source (battery) for supplying an operating current to the electric devices and an electronic control unit (not shown) configured to transmit a control signal to the electric devices. The electronic control unit may be installed in an inner space of the console 1.

The electronic control unit operates the opening and closing device 40 in response to a manipulation signal of the opening and closing button 80 to open or close the storage case 10. When the manipulation signal of the opening and closing button 80 is inputted in a state in which the storage case 10 is closed, the electronic control unit rotates the motor 41 for opening and closing in a forward direction to open the storage case 10, and when the manipulation signal of the opening and closing button 80 is inputted in a state in which the storage case 10 is opened, the electronic control unit rotates the motor 41 for opening and closing in a reverse direction to close the storage case 10. The opened or closed state of the storage case 10 may be recognized by the electronic control unit by installing a separate detection sensor at the upper housing 20 and transmitting a detection signal to the electronic control unit.

Further, the electronic control unit operates the variable fixing device 50 according to a detection result of the proximity sensor portion 60 to fix the smartphone P stored in the storage space 11. The proximity sensor portion 60 measures a distance from the sensor 61 to a side surface of the smartphone P facing the sensor 61 to transmit the measured distance to the electronic control unit. When a distance measured by one of the proximity sensor portions 60 is a and a distance measured by the other thereof is b, the electronic control unit calculates a movement amount c of each of the fixing parts 53*c* through (a+b)/2 (calculation formula 1) and operates the motor 51 for fixing to move each of the fixing parts 53*c* by a distance corresponding to c.

To this end, an end portion of each of the fixing parts 53*c* (a portion brought into contact with the side surface of the smartphone P) is installed on the same vertical line passing the sensor 61 of the proximity sensor portion 60, or when the movement distance of each of the fixing parts 53*c* is calculated, a difference in horizontal distance between the sensor 61 and the fixing part 53*c* should be reflected to the movement amount c of each of the fixing parts 53*c* (a horizontal distance between the sensor 61 and each of the fixing parts 53*c* is subtracted from the calculated value of the movement amount c).

As described above, when a detection signal is transmitted from the proximity sensor portion 60, the motor 51 for fixing is rotated to move the fixing parts 53*c* in a direction of approaching each other, and when the detection signal is not transmitted from the proximity sensor portion 60, the motor 51 for fixing is rotated in an opposite direction to move the fixing parts 53*c* to their initial positions (standby positions), i.e., control is performed to move the fixing parts 53*c* in a state in which the fixing parts 53*c* are maximally separated from each other.

As described above, when the smartphone P is fixed to the variable fixing device 50 and the storage case 10 is closed, the electronic control unit supplies power to the wireless charging device 30 to start wireless charging of the smartphone P. When the wireless charging is started, the opening and closing button 80 emits red light as described above, and then when the wireless charging is completed, the opening and closing button 80 emits green light to inform the user that the wireless charging of the smartphone P is completed.

An operation and an effect of the smartphone wireless charging storage device of a console for a vehicle according to the present invention will be described below.

In a state in which the smartphone P is not charged, the storage case 10 is always kept in a closed state. In the closed state, when a user presses the opening and closing button 80, the electronic control unit operates the motor 41 for opening and closing of the opening and closing device 40 in a forward direction.

Thus, the pinion gear 42 of the motor 41 for opening and closing is moved to an upper portion of the pinion gear movement hole 21 along the rack gear 21*a* of the upper housing 20, so that the storage case 10 is pivoted about the pivot shaft 10*a* to an outer rear side of the console 1, and thus the storage case 10 is opened.

When the storage case 10 is opened, the upper insertion hole 11*a* provided on top of the storage case 10 is exposed to the outside of the console 1, and the user inserts the smartphone P into the storage space 11 through the insertion hole 11*a*.

The smartphone P inserted into the storage space 11 is supported on the support 70, and in a state in which the smartphone P is supported on the support 70, an upper end portion of the smartphone P does not protrude upward beyond an upper end portion of the cover 14. In order to allow the smartphone P to be easily taken out from a state of being stored, the insertion hole 11*a* may be formed to be wide or a separate finger recess into which a finger is fitted may be formed at an edge of the insertion hole 11*a*.

After the smartphone P is stored in the storage space 11, the storage case 10 is closed by directly pushing the cover 14 or manipulating the opening and closing button 80. When the opening and closing button 80 is manipulated, the motor 41 for opening and closing is operated in the opposite direction by the electronic control unit, and thus the pinion gear 42 is rotated in a reverse direction, so that the storage case 10 may automatically return to its original position (the closed position).

When the smartphone P is stored in the storage space 11, each of the sensors 61 measures a distance to the smartphone P and transmits the measured distance to the electronic control unit.

The electronic control unit calculates the movement amount c of each of the fixing parts 53*c* through the above-described calculation formula 1 to operate the motor 51 for fixing according to the calculated movement amount c. Thus, the moving members 53 are moved in a direction of approaching each other by the operations of the pinion gear 52 and the rack gear 53*a*, so that each of the fixing parts 53*c* press and fix the side surfaces of the smartphone P.

As described above, the movement amount c of each of the fixing parts 53*c* may be calculated according to a size of the smartphone P and thus a position of each of the fixing parts 53*c* may be varied to match the size of the smartphone P to fix the smartphone P, such that the smartphone P may be always stably fixed regardless of the size of the smartphone P (precisely, a transverse length thereof). Therefore, a movement of the smartphone P is prevented during charging, such that the charging may be performed more efficiently.

Further, since the smartphone P is stably fixed and thus impact is not generated while the smartphone P is lifted from a fixed position and then is dropped during driving of a vehicle, so that there is an advantage in which durability of the smartphone P is not adversely affected.

As described above, when the storage case 10 is closed, the variable fixing device 50 is operated, and thus fixing of the smartphone P is completed in a state in which the smartphone P is stored, power is supplied to the wireless charging device 30 and thus charging starts.

Since the charging surface of the wireless charging device 30 is exposed to the storage space 11 through the communication hole 13, the smartphone P stored in the storage space 11 may be brought into direct contact with the charging surface of the wireless charging device 30, so that charging is smoothly performed.

The opening and closing button 80 emits red light during charging so that the user may recognize that charging is underway, and when charging is completed, the opening and closing button 80 emits green light so that the user may recognize a charging completed state.

When charging is completed, the user opens the storage case 10 by pressing the opening and closing button 80 and takes out the smartphone P, and to enable this, when the storage case 10 is opened in the charging completed state, the electronic control unit performs control of operating the motor 51 for fixing of the variable fixing device 50 in the reverse direction to return the fixing parts 53*c* to their original positions.

Meanwhile, the storage case 10 is installed inside the console 1 and thus is kept in a state of being located inside the console 1 when charging is performed, and only when the smartphone P is stored or taken out, the storage case 10 is opened to the outside of the console 1, so that the smartphone wireless charging storage device according to the present invention does not occupy a separate space in the vehicle interior, and thus there is an effect in that an inner space of the vehicle can be used more widely.

Further, the smartphone wireless charging device according to the present invention is installed at the console 1, and thus there is no need for a wireless charging tray to be installed at a center fascia where the plurality of parts are installed, so that there is an advantage of resolving difficulty in preparing an installation site of the wireless charging tray at a lower side of the center fascia.

As described above, in accordance with the present invention, a storage case having a wireless charger is installed at a console, and a variable fixing device configured to fix a smartphone by protruding according to a size of the smartphone is provided at the storage case, so that all kinds of smartphones can be stably fixed regardless of sizes of the smartphones.

Accordingly, since a charging position of a smartphone is stably maintained, charging efficiency of the smartphone can be improved and it is possible to prevent a movement of the smartphone due to vibration generated during driving of a vehicle, such that impact transmitted to the smartphone can be reduced to protect the smartphone.

Further, since the storage case is installed to be opened or closed in a pivoting manner at a rear surface of the console, there is no need to secure a space for installing a wireless charging tray at a lower portion of the center fascia, such that a separate inner space is not occupied during charging and thus there is an advantage in which the activity of a passenger is not hindered.

While the present invention has been described with reference to the exemplary embodiments shown in the drawings, these are merely illustrative, and those skilled in the art to which the present invention pertains will understood that various modifications and equivalent other embodiments can be implemented within the spirit and scope of the invention. Therefore, the true technical scope of the present invention should be defined by the appended claims.

What is claimed is:

1. A smartphone wireless charging storage device of a console for a vehicle, the device comprising:
   a storage case configured to be installed inside the console and to be pivotally opened or closed through an opening formed at the console, and having a storage space in which a smartphone is inserted and stored;
   an upper housing and a lower housing, each of which is configured to be installed at an inner surface of the console and enclose the storage case;
   a wireless charging device configured to be installed inside the storage case;
   an opening and closing device configured to be installed between the storage case and the upper housing and open or close the storage case;
   a variable fixing device configured to be installed at the storage case and to be varied according to a size of the smartphone stored in the storage case, thereby supporting and fixing a side surface of the smartphone; and
   an electronic control unit configured to control operations of the wireless charging device, the opening and closing device, and the variable fixing device,
   wherein a first mounting part is formed to protrude from both sides of a rear surface of the storage case and a motor installation part is formed at the first mounting part, the opening and closing device includes a motor for opening and closing installed at the motor installation part and a pinion gear installed at an output shaft of the motor for opening and closing, and an arc-shaped pinion gear movement hole concentric with a pivot axis of the storage case is formed at the upper housing, and a rack gear is formed at one side surface of the pinion gear movement hole and is engaged with the pinion gear of the motor for opening and closing.

2. The device of claim 1, wherein a wireless charging device installation space is formed inside the storage case, the wireless charging device is installed in the wireless charging device installation space, the wireless charging device installation space is communicated with the storage space through a communication hole, and a charging surface of the wireless charging device is exposed through the communication hole to form one side surface of the storage space.

3. The device of claim 1, wherein:

a box-shaped second mounting part having both open sides is formed at the rear surface of the storage case, and the variable fixing device includes a motor for fixing installed at a rear surface of the second mounting part, a pinion gear installed at an output shaft of the motor for fixing, and a pair of moving members configured to be inserted into and installed at the second mounting part and each of which has a rack gear engaged with the pinion gear of the motor for fixing and a fixing part for supporting one side surface of the smartphone stored in the storage space.

4. The device of claim 3, wherein a flange is formed at an outer end portion of each of the pair of the moving members in a rear direction perpendicular to each of the pair of the moving members, and the fixing part is formed to protrude inward the storage space at the flange.

5. The device of claim 3, wherein end portions facing each other of the pair of the moving members are formed in inclined surfaces parallel to each other, and horizontal rack gears are respectively formed at end portions of the inclined surfaces and are respectively engaged with an upper portion and a lower portion of the pinion gear of the motor for fixing.

6. The device of claim 3, wherein an installation recess is installed at both side surfaces of the storage case, a proximity sensor portion is installed at an upper portion of the installation recess, and a sensing hole is formed on an inner wall surface of the installation recess corresponding to a sensor of the proximity sensor portion so as to allow the sensor of the proximity sensor portion to measure a distance to the side surface of the smartphone inserted into the storage space.

7. The device of claim 6, wherein the sensor of the proximity sensor portion measures the distance to the smartphone and transmits the measured distance to the electronic control unit, the electronic control unit calculates a movement amount of the fixing part by halving the sum of the measured values of the sensors, and the electronic control unit operates the motor for fixing to move the fixing part according to the movement amount.

8. The device of claim 7, wherein the sensor of the proximity sensor portion and an end portion of the fixing part are positioned on the same vertical line.

9. The device of claim 7, wherein the electronic control unit calculates the movement amount of the fixing part by subtracting a horizontal distance between the sensor and the end portion of the fixing part from a value obtained by halving the sum of the measured values of the sensors.

10. The device of claim 6, wherein, when the storage case is closed and a measurement signal of the proximity sensor portion is inputted, the electronic control unit operates the motor for fixing to move the pair of the moving members in a direction of approaching each other, and when the storage case is opened, the electronic control unit operates the motor for fixing in an opposite direction to return the pair of the moving members to standby positions.

11. The device of claim 1, wherein an opening and closing button is provided on an outer surface of the console to transmit a manipulation signal for opening or closing the storage case to the electronic control unit.

12. The device of claim 11, wherein the opening and closing button has a light emitting diode (LED) element therein and emits lights with different colors when charging of the smartphone is underway by the wireless charging device and when charging of the smartphone is completed.

13. The device of claim 1, wherein a support is provided below the storage space of the storage case to support a lower surface of the smartphone.

* * * * *